United States Patent [19]

Tovim

[11] 4,265,314
[45] May 5, 1981

[54] HORSE SHOES

[76] Inventor: Igal Tovim, Xillers Farm, Norwood End, Fyfield, Ongar, Essex, England

[21] Appl. No.: 40,412

[22] Filed: May 18, 1979

Related U.S. Application Data

[63] Continuation of Ser. No. 777,506, Mar. 14, 1977, abandoned.

[30] Foreign Application Priority Data

Mar. 16, 1976 [GB] United Kingdom ............... 10428/77

[51] Int. Cl.³ .......................... A01L 3/00; A01L 5/00
[52] U.S. Cl. .......................................... 168/4; 168/17; 168/24
[58] Field of Search ..................... 168/4, 6, 12, 17, 18, 168/19, 20, 24, DIG. 1

[56] References Cited

U.S. PATENT DOCUMENTS

| | | | |
|---|---|---|---|
| 219,944 | 9/1879 | Hoffmann | 168/DIG.1 |
| T889,004 | 8/1971 | Hyche et al. | 168/4 |
| 3,302,723 | 2/1967 | Renkenberger et al. | 168/24 X |
| 3,490,536 | 1/1970 | Hourlier | 168/4 |
| 3,664,428 | 5/1972 | Spencer | 168/4 |
| 3,961,668 | 6/1976 | Sirles | 168/4 |

Primary Examiner—Gene Mancene
Assistant Examiner—Robert P. Swiatek
Attorney, Agent, or Firm—Alexis Barron

[57] ABSTRACT

A method of and apparatus for shoeing horses using a plastics material horse shoe. A flexible L-shaped strip, preferably preformed from plastics to fit a hoof, is adhered to the front and side walls of the hoof as well as to the peripheral region of the sole. Then the plastics shoe is adhered to the underside of the strip. The provision of a separate strip allows a satisfactory indirect bond of the shoe to the hoof by using anaerobic, fast-setting adhesives. The strip should be relatively resilient, whereas the shoe should be relatively hard and rigid.

12 Claims, 7 Drawing Figures

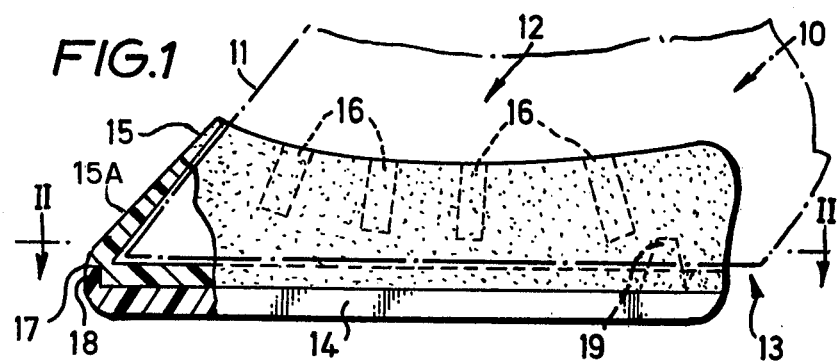
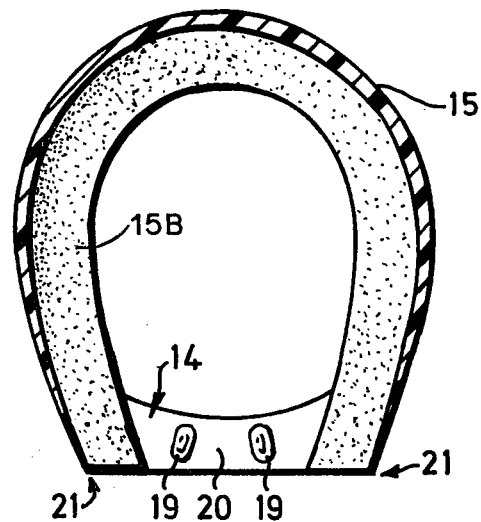
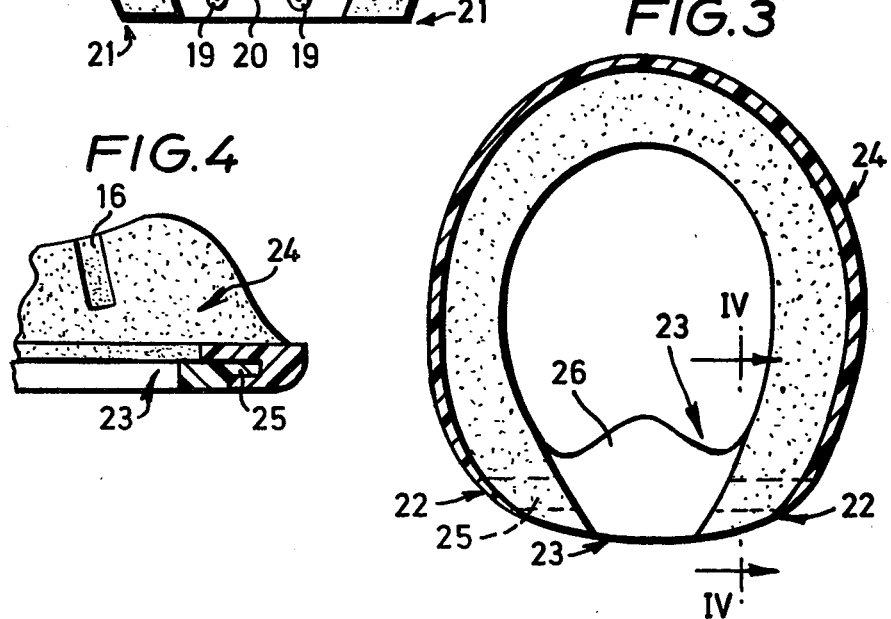

HORSE SHOES

CROSS REFERENCE TO RELATED APPLICATIONS

This is a continuation of application Ser. No. 777,506, filed Mar. 14, 1977, now abandoned.

BACKGROUND OF THE INVENTION.

(a) Field of the Invention

This invention relates to horse shoes, and in particular to methods of and apparatus for attaching horse shoes to horses' hooves.

(b) Description of the Prior Art

For several hundreds of years farriers have practised the skill of shoeing horses with no substantial changes in the techniques employed. The usual procedure of shoeing the horse is to trim the keratinous portion of the hoof to the required length, and then an iron shoe is forged to match the trimmed hoof. Once cool, the shoe is attached to the trimmed hoof by means of nails hammered through holes in the shoe into the hoof so that the nails project through the hoof wall part way from the bottom thereof. The projecting nails are then cut off and cleated over as necessary.

The process described above is obviously in general most satisfactory, for it has been practised for a very long time. It does however have disadvantages which can lead to lameness in a horse. For example, if when shoeing a nail penetrates the sensitive part of a foot or if a horse casts off a shoe, leaving some nails projecting from the bottom of the hoof and on which the horse subsequently steps, acute problems can be caused. Furthermore, a horse with brittle horn material sometimes cannot be shod because the nails would split the material, and similarly a horse with slow-growing horn material can also be difficult to shoe because the old nail-holes lead to splits. A further disadvantage is that the process described is a skilled art which cannot properly be practised by those not previously trained as farriers.

OBJECTS OF THE INVENTION

It is a principle object of this invention to provide a method of and apparatus for shoeing a horse which overcome at least some of the above disadvantages of conventional horse-shoeing techniques. A further object is to provide a method of shoeing horses which is simple to use and may be practised by persons not possessing special skills.

Another object of the invention is to provide a method of attaching a plastics material horse shoe to a horse's hoof in such a manner as to give a reliable and secure bond of the shoe to the hoof. Yet another object is to provide a shoeing technique which will allow a horse to be used extensively on hard or metalled surfaces without suffering from concussion of the foot.

Other objects and advantages will become apparent from the following detailed description of this invention.

SUMMARY OF THE INVENTION

In accordance with these objects, this invention provides a method of attaching a plastics material horse shoe to a horse's hoof, which method comprises the steps of initially adhering a pre-formed strip of flexible material having an L-shaped cross-section to both the wall and the peripheral region of the sole of the hoof around the front and sides thereof, and then adhering a pre-formed plastics material horse shoe to at least the face of the pre-formed strip opposed to the sole of the hoof.

By the term 'plastics material', as used herein, is meant both synthetic and natural polymers and monomers, such as rubber or cellulosic formulations and synthetic resins.

Clearly, in view of the large stresses imparted to a horse shoe when in use, the adhesives employed for adhering the strip both to the horse's hoof and to the shoe must carefully be selected so as to offer very high shear and peel strengths. Also, the adhesive should display good flexural and impact properties, and good gap-filling properties are desirable. Tests have shown that anaerobic adhesives, such as cyanoacrylate adhesives, or acrylic adhesives, with an amine initiator and possibly an accelerator are useful. It is of course important that the adhesive sets relatively quickly, for otherwise the bond may be disturbed before setting is completed. To assist detection of setting, the adhesive may incorporate a dye which changes color as the glue sets. This can then also be used to detect if a pre-prepared quantity of the glue has 'set-off', so that it should not be used for adhering the strip to a hoof or shoe, and to indicate fresh adhesive should be used. The setting of the adhesive may be accelerated further by using hot air draughts or heated blocks of material. The strip employed in this invention must be flexible so that it can be adapted to fit any particular horse hoff—for the exact shape of a hoof varies quite considerably from horse to horse, even for hooves of substantially the same size. It is advantageous however for the strip to be preformed so as to be generally in the shape of a horse's hoof (when considered in plan), so that any flexing necessary to make it fit a particular hoof is relatively minor. Any flexing required can be taken up by providing regions of reduced wall thickness in the part of the strip which is adhered to the wall of the hoof. Instead, cut-out portions or slits may be provided in the strip to accommodate excessive flexing.

The attachment of the pre-formed strip to the hoof may be improved by means of a strap connected to or formed integrally with the strip, which strap is passed around the bulbs of the heel of the hoof. By providing two enlarged portions, possibly concavely pre-shaped, in the strap in which portions the two bulbs of the heel are located, slippage of the strap can be resisted. Preferably the strap is under tension when fitted over the bulbs of the heel, either by stretching elastically the strap, or by means of a strap length adjuster incorporated therein.

It is found that horses shod in the conventional manner with metal shoes can suffer damage to their feet if they travel extensively on hard or metalled surfaces, on account of the impact forces every time the foot touches the surface. In an attempt to alleviate the possibility of damage, it is preferred that the generally L-shaped strip used in this invention has resilient properties as well as being flexible. A preferred material for the strip is a polyurethane elastomer, advantageously of Shore 'A' hardness of from 82 to 88, though other plastics materials and other resiliences (or hardnesses) could be used.

The shoe itself must be relatively hard and durable, but also capable of being adhered sufficiently firmly to the strip. The preferred plastics material is polyurethane elastomer, but of a greater hardness than the strip; typically, a Shore 'A' hardness of from 95 to 99 is suitable. The shoe is preferably performed to the required shape and size— and so it is envisaged that the shoes will be moulded in a range of shapes and sizes. However, the shoe may easily be trimmed once adhered to the strip to complete the shoeing.

To assist the location and attachment of the shoe to the flexible strip, it is preferred for the shoe to be located on the strip by means of at least one projection provided on one of the strip and the shoe and engaged with a recess on the other of the strip and the shoe. The projection and corresponding recess advantageously are provided on the toe portion of the strip and shoe.

To locate the rear part of the shoe and to resist sideways movement thereof, it is preferred for there to be a bar extending between the tips of the shoe, which bar is provided with a pair of upstanding pegs locatable one in each gap of a hoof, to both sides of the frog. By making the bar substantially rigid, the two tips of the horse shoe are tied together and only by peeling both tips from the strip can the shoe be removed. Also, the pegs engaged in the V-shaped recesses (or gaps) of the hoof to each side of the frog restrain sideways movement of the bar, and thus of the shoe tips. The pegs preferably are tapered, so as to correspond generally in shape to the gaps. The strip may be provided with a pair of flaps, one on each free end thereof and extending towards the other, which flaps also fit into said gap, urged therein by the action of the pegs on the bar of the shoe.

Another possibility, which may be used in conjunction with a bar and pegs, is for the free end tips of the shoe to be attached mechanically to the strip to resist peeling of the shoe from the strip. For instance, interengaging lugs and channels may be provided on the strip and shoe.

This invention also extends to apparatus for shoeing a horse, comprising a strip of flexible material having a generally L-shaped cross-section and pre-formed to fit against both the wall and peripheral region of the sole of a hoof around the front and sides thereof and a preformed plastics material horse shoe adapted for adhering to the pre-formed strip when the latter has been adhered to a horse's hoof.

The flexible strip preferably is provided with a strap which is arranged to pass around the bulbs of the heel of the horse's hoof when the strip is fitted to the wall and peripheral region of the sole of the hoof. The strap advantageously has two broadened portions pre-shaped to present concave faces to the bulbs of the heel, whereby slippage of the strap may be resisted by the bulbs. The strap can be formed separately, but conveniently is formed integrally with the flexible strip. Also, the strap may be elastic or may be provided with a length adjuster, so that the strap can be passed over the bulbs of the hoof under tension.

BRIEF DESCRIPTION OF THE DRAWINGS

Preferred embodiments of this invention are shown in the accompanying drawings, in which:

FIG. 1 is a side view of a horse's hoof fitted with a horse shoe in accordance with the method of this invention, parts of the equipment being shown in section;

FIG. 2 is a sectional view of the arrangement shown in FIG. 1, and taken on line II—II on that figure;

FIG. 3 is a plan view of a second form of horse shoe and strap for use in performing the method of this invention;

FIG. 4 is a sectional view on line IV—IV on FIG. 3;

DESCRIPTION OF THE PREFERRED EMBODIMENTS

Figure 5:
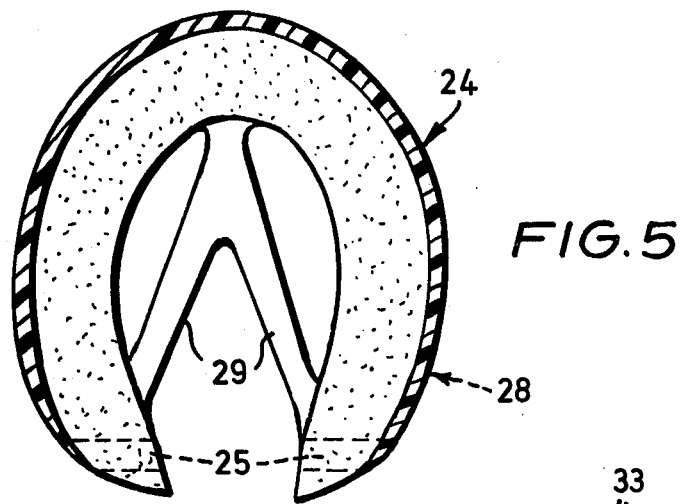
FIG. 5 is a plan view of a third form of horse shoe for use in the method of this invention.

Referring to FIGS. 1 and 2, there is shown in outline the structure of a horse's foot, which comprises a keratinous material shell constituting the wall of the hoof. The hoof 10 includes, in the region of the toe, a front wall 11 which merges with a side wall 12 extending round to the heel 13. Between the side walls 12 at the heel is the frog, and the peripheral region of the sole is known as the horn. The nails are driven into the horn when fastening conventional metal shoes to the hoof so that the nails project out of the front and side walls of the hoof, to be trimmed and then cleated over.

FIG. 1 shows partly in section a plastics material horse shoe 14 attached indirectly to the hoof 10 in accordance with the method of this invention, by utilising a pre-formed, generally L-shaped strip 15 adhered both to the front and side walls of the hoof and to the peripheral region of the sole of the hoof, the shoe then being adhered to the strip 15. The generally L-shaped strip 15 which includes a side wall 15A and a bottom wall 15B, is preformed to have the general shape of a horse's hoof, and is made of a flexible material so that is may be deformed locally to fit closely to a particular hoof.

The selection of the materials for making the strip 15 and the shoe 14 is important in order to obtain the required performance. The shoe 14 must be relatively hard and resistant to abrasion, but must also be amenable to attachment to the strip 15 by glueing. The strip 15 must be flexible so as to allow it to be fitted closely to the hoof 10, and must allow glueing thereof both to the shoe 14 and to the keratinous material of the hoof. It is also advantageous for the strip 15 to display at least slightly resilient properties, so as to allow a measure of shock absorption. This reduces the impact forces transferred to a horse's hoof when travelling on hard roads, and also helps to reduce the forces imparted to the glues used to hold the strip 15 to the hoof.

Taking the above into account, it has been established that different grades of plyurethane elastomer are suitable for both the shoe and the strip. Using this material, a Shore 'A' hardness of substantially 97 has been found appropriate for the shoe and a Shore 'A' hardness of substantially 85 for the strip.

Many types of adhesive could be used, but the required properties include high shear, peel, flexural and impact strength, and preferably a good gap-filling property. Furthermore, because weight must be kept off the hoof whilst the adhesive is setting, it is important that the adhesive sets rapidly. Of course, the adhesive must be compatible with the materials selected for the shoe and the strip, as well as with the keratinous material of the hoof. Preferred types of adhesive include anaerobic glues such as the cyanoacrylate family, and acrylic glues with an amine initiator and possibly an accelerator to ensure rapid setting.

The wall thickness of the side wall 15A of the strip 15 which lies against the side walls of the hoof tapers so as to reduce the likelihood of the strip being accidentally torn off.

The strip 15 is provided with regions 16 of reduced wall thickness, so as to allow local deformation of the strip without causing buckling of the material away from the hoof wall. Instead of said regions 16, slits extending from the top edge of the strip may be provided, or cut-out portions in the side wall of the strip.

When using adhesives which set rapidly, it is important that the shoe 14 is properly located on the strip 15 as the shoe is presented thereto, because movement of the shoe may not be possible after a few seconds. To locate the shoe, the strip at the front thereof (i.e. by the toe) has a recess 17, there being a corresponding projection 18 in the toe of the shoe to fit in the recess 17.

Location of the rear of the shoe is effected by a pair of pegs 19 upstanding from a bar 20 extending between the rear tips 21 of the shoe, the pegs fitting within the gaps present in a horse's hoof to each side of the frog. The bar 20 serves firmly to tie the two tips 21 together and sideways movement of the tips is prevented by the engagement of the pegs 19 with said gaps. The pegs may be bifurcated, to allow them to deform to fit closely within the gaps.

The front and back hooves of horses are in general of two distinct shapes, though of course there is a considerable variation in size. It is envisaged therefore that the shoes 14 and strips 15 will be made in two distinct styles—one for front hooves and one for back hooves. Each style will be made in several sizes, to enable an appropriate strip and shoe to be selected for any particular hoof of a very wide range of horses. The strip can be deformed locally, as described above, in order to fit closely against the wall and peripheral region of a hoof, and though the shoe cannot easily be deformed—on account of its greater hardness—it can nevertheless be trimmed before or after being adhered to the strip. By providing a relatively resilient strip 15, strain thereon, when fitting it to the hoof, is avoided and a good foundation for a relatively hard shoe 14 is provided.

To change a shoe fitted in accordance with the invention, the old shoe and part of the strip are removed with a sharp knife or by using the usual tools for trimming the keratinous material of a hoof. After cutting back the wall of the hoof in the usual way because of the growth thereof, the remaining part of the strip adhered to the side wall can be removed with a rasp. This also has the effect of helping to clean the side wall to allow good adhesion thereto but chemical cleaners may be used as well. Next, the selected strip has a coating of adhesive applied to its inwardly-directed faces, and the strip is pressed on to the front and sides of the hoof wall, as well as to the peripheral region of the sole. Finally, the selected shoe is coated with adhesive on its upper face, and then pressed on to the strip, care being taken to locate the projection 18 in the recess 17, whilst the pegs 19 will locate the rear of the shoe by their engagement in the gaps in the hoof. Once the adhesive has set, the horse may place weight on the fitted shoe.

FIGS. 3 and 4 show an alternative arrangement, in which no pegs 19 are employed and instead the rear tips 22 of the shoe 23 are attached mechanically to the strip 24. As can be seen, the tips 22 are of reduced thickness, and fit within channels 25 provided on the strip. This arrangement is especially resistant to the shoe 23 being peeled from the strip 24. The bar 26 of the shoe is also shaped to protect the frog of the hoof, but in other respects this arrangement, and the method of using it, is similar to that described above with reference to FIGS. 1 and 2.

FIG. 5 shows another form of shoe, for use with the strips 24 of FIGS. 3 and 4. In this shoe, the bar is absent, but instead the shoe 28 is braced by elements 29. This shoe offers considerable protection to the sole of a hoof and is valuable if there are defects such as softness in the keratinous material of the sole.

Figure 6:
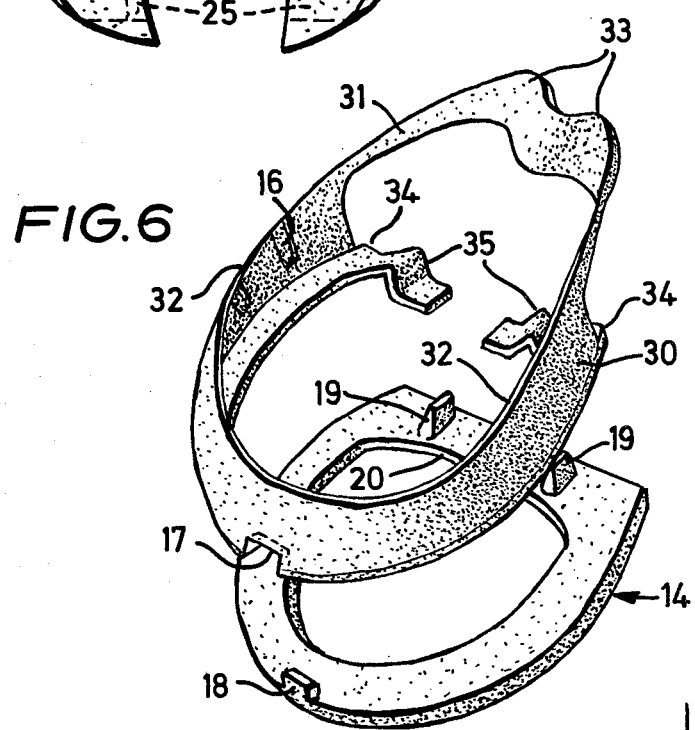
FIG. 6 is a perspective view of a second form of strip and shoe for use in performing this invention.
Figure 7:
FIG. 7 is a sketch showing the strip and shoe of FIG. 6 fitted to the horse's hoof.

FIGS. 6 and 7 show another embodiment of strip 30 for attaching a plastics material shoe, such as that shown in FIG. 2, to a hoof. The strip 30 is in general similar to that shown in FIG. 1, but includes a strap 31 formed integrally therewith and extending from the two sides 32 thereof; the strap is provided with two portions 33 of enlarged width, intermediate its ends. The rear tips 34 of the strip are provided with flaps 35 extending towards each other, pre-formed in shape, as shown.

In use, the strip 30 is coated with adhesive as with the strip 15 described above, and is then pressed on to the hoof. The strap 31 is stretched to pass around the heel of the hoof, the enlarged portions 33 being positioned over the bulbs of the heel. The strap, if so positioned under tension, forms itself around the bulbs of the heel, to prevent slippage of the strap. The tension also assist the adhesive in holding the strip 30 in place on the hoof.

The enlarged portions 33 of the strap may be arranged to protect the bulbs of the front hooves against damage from the back hooves. To this end, the enlarged portions 33 may be of considerably greater extent than is shown in FIG. 6, or even may be provided with extra padding or cushioning.

When the shoe 14 is fitted, as described above, the flaps 35 are pressed by the pegs 19 into the gaps in the hoof, and thus the flaps serve to anchor the tips 34 of the strip. This assists the action of the adhesive in holding the strip in position.

What is claimed is:

1. A method of shoeing a horse comprising the steps of providing a strip of flexible resilient plastic material having an L-shaped cross section and being performed to fit against both the wall and peripheral region of the sole of a horse's hoof around the front and sides thereof, the flexibility and resilience of the strip permitting the deformation of the side wall thereof as necessary to conform to the curvature of the hoof without substantially affecting the configuration of the bottom wall thereof, adhesively bonding said preformed strip to a horse's hoof while deforming said strip as necessary to conform closely to the configuration of both the wall and sole portion of the hoof to thereby maximize the adhesively bonded surface contact of the strip with the wall and sole of the hoof, providing a preformed plastic horse shoe, said horse shoe being formed of an abrasion resistant plastic material of substantially greater hardness than the plastic material of said strip, and bonding said horse shoe to the face of said preformed strip opposed to the sole of the hoof.

2. This method as claimed in claim 1, wherein said strip is preformed from a relatively resilient grade of polyurethane elastomer and said shoe is preformed from a relatively hard grade of polyurethane elastomer.

3. The method as claimed in claim 1, including means for locating said shoe on said strip, said means comprising at least one projection on the toe portion of either the strip or shoe and a recess adapted to receive said projection on the other of either said strip or shoe.

4. The method as claimed in claim 1, wherein said strip includes an integral resilient strap preformed to pass around the bulb of the heel of a horse's hoof.

5. A method as claimed in claim 1, including a bar between the rear tips of said shoe and a pair of upstanding pegs on said bar, said pegs being received in the gaps of a horse's hoof at each side of the frog upon application of the shoe to the strip.

6. The method as claimed in claim 1, wherein the free ends of said shoe are mechanically attached to said strip.

7. Apparatus for shoeing a horse, comprising a strip of flexible resilient material having an L-shaped cross section and being preformed to fit against both the wall and peripheral region of the sole of a horse's hoof around the front and sides thereof, said preformed strip being adapted for adhesive application to a horse's hoof and having sufficient flexibility to readily conform closely to the configuration of both the wall and sole portion of the hoof to thereby maximize the adhesively bonded surface contact of the strip with the wall and sole of the hoof, the flexibility and resilience of the strip permitting the deformation of the side wall thereof as necessary to conform to the curvature of the hoof without substantially affecting the configuration of the bottom wall of the strip and its conformance to the sole of the hoof, a preformed plastic horse shoe, said horse shoe being formed of an abrasion resistant plastic material of substantially greater hardness than the plastic material of said strip, said plastic horse shoe being preformed for bonding to said preformed strip after said strip has been adhesively bonded to a horse's hoof.

8. The apparatus as claimed in claim 7, wherein said strip is preformed from a relatively resilient grade of polyurethane elastomer and said shoe is preformed from a relatively hard grade of polyurethane elastomer.

9. The apparatus as claimed in claim 7, including means for locating said shoe on said strip, said means comprising at least one projection on the toe portion of either the strip or shoe and a recess adapted to receive said projection on the other of either said strip or shoe.

10. The apparatus as claimed in claim 7, wherein said strip includes an integral resilient strap preformed to pass around the bulb of the heel of the horse's hoof.

11. An apparatus as claimed in claim 7, including a bar between the rear tips of said shoe and a pair of upstanding pegs on said bar, said pegs being received in the gaps of a horse's hoof at each side of the frog upon application of the shoe to the strip.

12. The apparatus as claimed in claim 7, wherein the free ends of said shoe are mechanically attached to said strip.

* * * * *